United States Patent [19]

The et al.

[11] Patent Number: 4,676,959

[45] Date of Patent: Jun. 30, 1987

[54] BAYER PROCESS FOR PRODUCING ALUMINUM HYDROXIDE HAVING IMPROVED WHITENESS

[75] Inventors: Paul J. The, Murrysville; Chanakya Misra, Pittsburgh, both of Pa.

[73] Assignee: Aluminum Company of America, Pittsburgh, Pa.

[21] Appl. No.: 825,259

[22] Filed: Feb. 3, 1986

Related U.S. Application Data

[63] Continuation-in-part of Ser. No. 816,242, Jan. 6, 1986.

[51] Int. Cl.$^4$ .............................................. B01D 13/00
[52] U.S. Cl. .................... 423/130; 423/127; 423/629; 423/112; 210/651; 210/654
[58] Field of Search ............... 210/650, 651, 652, 654; 423/112, DIG. 14, 130, 127, 629

[56] References Cited

U.S. PATENT DOCUMENTS 4,207,182 6/1980 Marze .................................. 210/650
4,366,129 12/1982 Czeglédi et al. .................... 423/112

OTHER PUBLICATIONS

*Encyclopedia of Chemical Technology*, 1978, vol. 2, pp. 140–143.
*Hackh'S Chemical Dictionary*, McGraw Hill, Fourth Edition, 1969, p. 32.
Chapurlat, C. L. Brousse and Quentin, J. P. *Desalination*, 18, No. 2, Apr. 1976, Elsevier Scientific Publishing Co.

*Primary Examiner*—David Sadowski
*Assistant Examiner*—Jeffrey W. Peterson
*Attorney, Agent, or Firm*—Andrew Alexander; John P. Taylor

[57] ABSTRACT

A process for producing aluminum hydroxide product having an improved level of whiteness is disclosed. In the process, a caustic solution having dissolved aluminum hydroxide is subjected to purification to remove color producing humate material. Purification includes passing the caustic solution through a semi-permeable membrane. The solution purified of humate material is treated to precipitate aluminum hydroxide therefrom.

7 Claims, 5 Drawing Figures

MEMBRANE ULTRAFILTRATION FLOW SHEET

MEMBRANE ULTRAFILTRATION FLOW SHEET

MEMBRANE ULTRAFILTRATION FLOW SHEET

EFFECT OF PRESSURE ON FILTRATION RATE

BAUXITE DIGESTION FLOW SHEET

BAYER PROCESS FOR PRODUCING ALUMINUM HYDROXIDE HAVING IMPROVED WHITENESS

CROSS REFERENCE TO RELATED APPLICATIONS

This application is a continuation-in-part of Paul J. The et al U.S. Pat. application Ser. No. 816,242, filed Jan. 6, 1986.

FIELD OF THE INVENTION

This invention relates to an improved process for lowering impurities in Bayer liquor. More particularly, it relates to production of higher quality aluminum hydroxide with improved color characteristics.

BACKGROUND OF THE INVENTION

The recovery of aluminum hydroxide from bauxite and similar alumina-bearing materials according to the Bayer process is achieved by digesting the ore with caustic liquor. The major portion of the alumina values are dissolved by the liquor, and the major portion of the unwanted ore constituents remain undissolved, making it separable from the liquor. The undissolved constituent is often referred to as "red mud". After pressure digestion of bauxite with caustic liquor, the red mud is removed from the sodium aluminate liquor by decantation and filtration, and the aluminum hydroxide is separated from the supersaturated sodium aluminate liquor, known as "green" or "pregnant" liquor, by precipitation. During the precipitation process, the supersaturated sodium aluminate liquor is cooled and mixed with a slurry of fine aluminum hydroxide which acts as seed to induce formation of its own species. Following the precipitation period, the slurry is pumped through a classification system. The coarse fraction of the crystallized aluminum hydroxide is separated from the sodium aluminate liquor and the resulting spent sodium aluminate liquor is recycled to be mixed with incoming bauxite in the digester.

High levels of impurities are undesirable in the "green" liquor used to produce aluminum hydroxide. Impurities decrease the whiteness or color purity of the aluminum hydroxide and, therefore, it is desirable to minimize those impurities in green sodium aluminate liquor before crystallization of aluminum hydroxide takes place. Typically, the impurities result in an aluminum hydroxide product having a whiteness of lower than 70% which greatly affects its use in commercial products where a high level of whiteness is required. The present invention solves the problem of poor whiteness and is capable of producing an aluminum oxide product having levels of whiteness powder of 90% or more. The whiteness level is relative to $TiO_2$ which is considered to have a whiteness of 100%.

It is also well known that the presence of organic and inorganic impurities in a caustic sodium aluminate liquor causes process problems, lowers liquor productivity, and reduces the purity of the produced alumina. Difficulties caused by the organic impurities include lowered alumina yield, generation of excessive fine aluminum hydroxide particles, a higher impurity content in the alumina, colored liquor and aluminum hydroxide, lower red mud settling rate, loss of caustic due to formation of sodium organic compounds, increased liquor density, higher viscosity, raising of the boiling point, and foaming of the liquor.

Numerous methods are known for controlling and/or removing the organic material in Bayer process liquor. These include the treatment of the process liquor with sodium hypochlorite or other oxidizing agents such as oxygen or air. For example, German patent document Off. 2,945,152 describes a process for removing organic compounds from Bayer liquor by heating the liquor to 120° to 350° C. and introducing oxygen containing gas until a partial pressure of 3 to 30 atmospheres is reached. Inao et al U.S. Pat. No. 4,215,094 discloses a process for removing organic substances by contacting the aluminate solution with molecular oxygen containing gas in the presence of copper ions as a catalyst at an elevated temperature, e.g. 180° to 300° C.

It is also known to remove some impurities in a Bayer liquor by treatment with alkaline earth compounds. Schepers et al U.S. Pat. No. 4,046,855 teaches the treatment of aluminate liquor with a magnesium compound to remove organic materials. Mercier et al U.S. Pat. No. 4,101,629 treats a solution from the Bayer process with a barium compound to remove impurities. German patent document Off. 2,415,872 involves the addition of a calcium compound to the process liquor to remove the humic matter as insoluble calcium compounds.

Impurity levels of organic materials such as sodium oxalate have also been removed from sodium aluminate solutions as taught by Lever U.S. Pat. No. 4,275,042 by the use of cationic sequestrants comprising quaternary nitrogen compounds possessing medium and long chain alkyl groups and a single cationic charge. DeLaBretique U.S. Pat. No. 3,457,032 also discloses purification of a strongly alkaline solution such as sodium aluminate solution by treating the solutions with anion exchange resins of strongly basic and macroreticular type which are said to widely eliminate iron, silica, titanium, zinc, and organic acid impurities.

The removal of sodium oxalate from a sodium aluminate spent liquor solution by spraying the concentrated liquor onto a packing material is disclosed by Carruthers et al U.S. Pat. No. 4,038,039. Bush et al U.S. Pat. No. 4,496,524 teaches the removal of sodium oxalate from a sodium aluminate spent liquor by treatment with ethanol to cause the sodium oxalate to precipitate.

Yamada et al U.S. Pat. No. 4,280,987 removes carbon compounds from Bayer liquor by adjusting the molar ratio of the aluminum component to the sodium component and then heating the liquor to form sodium aluminate and drive off the carbon compounds as carbon dioxide.

Bird et al U.S. Pat. No. 4,282,191 describes the removal of zinc impurities from a caustic sodium aluminate solution using zinc sulfide seed to cause precipitation of the zinc in the liquor. Columbo et al U.S. Pat. No. 3,295,961 discloses a process for removal of iron impurities from the red mud slurry from a Bayer process by first drying the mud and then heating it to reduce the iron compound to metallic iron which is then separated from the dried mud using magnetic separation. Goheen U.S. Pat. No. 3,729,542 teaches the removal of iron impurities in a sodium aluminate solution by filtering the solution through a bed of iron particulate.

Conventional filtration is also, of course, known in the separation of sodium aluminate solutions from the red mud residue of a Bayer process digestion. For example, Corona U.S. Pat. No. 2,653,716 describes the cleaning of filter cloths used to separate sodium aluminate solutions from red mud.

The use of osmotic type filtration is known in the purification, for example, of water using reverse osmosis. Typical of such apparatus and associated processing are the disclosures in McLain U.S. Pat. No. 3,422,008; Coillet U.S. Pat. No. 4,161,446; Davis U.S. Pat. No. 4,367,132; and Klein et al U.S. Pat. No. 4,495,067. However, the purification of a highly caustic solution presents problems not normally encountered when purifying water. By highly caustic solution is meant solution from the Bayer process such as a sodium aluminate solution or caustic solutions having 1 wt. % or greater NaOH concentration or caustic solutions having a pH higher than 10.

SUMMARY OF THE INVENTION

It is therefore an object of this invention to provide a system for purifying caustic solutions such as sodium aluminate solutions by filtration.

It is another object of this invention to provide a system for purifying caustic solutions such as sodium aluminate solutions by membrane ultrafiltration using porous hollow fibers coated with a semipermeable membrane.

It is yet another object of this invention to provide a system for purifying caustic solutions such as sodium aluminate solutions by reverse osmosis using porous hollow fibers coated with a semipermeable membrane wherein both the hollow fibers and the semipermeable membrane are capable of withstanding exposure to a caustic environment.

It is a further object of this invention to provide a system for purifying caustic solutions such as sodium aluminate solutions by reverse osmosis using porous polysulfone hollow fibers coated with a semipermeable sulfonated polysulfone membrane capable of withstanding exposure to a caustic environment.

And yet it is a further object of this invention to provide an aluminum hydroxide having a level of brightness of at least 90% and having lower levels of organic matter.

These and other objects of the invention will become apparent from the following description and accompanying drawings.

In accordance with the invention, there is disclosed a process for producing an improved aluminum hydroxide product having an improved level of whiteness. The process comprises the steps of subjecting a caustic solution containing dissolved aluminum hydroxide to a purification step to remove dissolved impurities including color producing humate material therefrom, the purification including passing the solution through a semipermeable membrane capable of separating the humate material from the solution. After separation, the purified solution is treated to precipitate aluminum hydroxide therefrom. The aluminum hydroxide has an improved level of whiteness. Other impurities which can be removed include iron, silicon and sodium compounds.

DETAILED DESCRIPTION OF THE INVENTION

Figure 4:
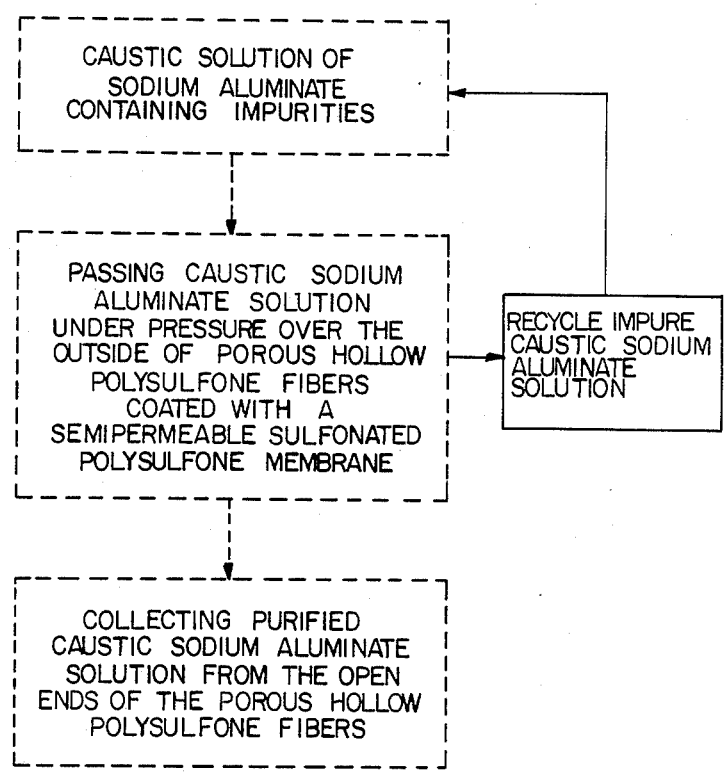
FIG. 4 is a flow sheet illustrating the system of the invention.

As illustrated in the flow sheet in FIG. 4, in accordance with the invention, a caustic solution such as a solution of Bayer liquor which comprises sodium aluminate dissolved in caustic, may be purified by bringing the solution into contact, under pressure, with a filtration medium comprising a semipermeable membrane to separate the impurities from the solution. For purposes of the present invention, the membrane must be inert with respect to highly caustic solutions.

Figure 1:
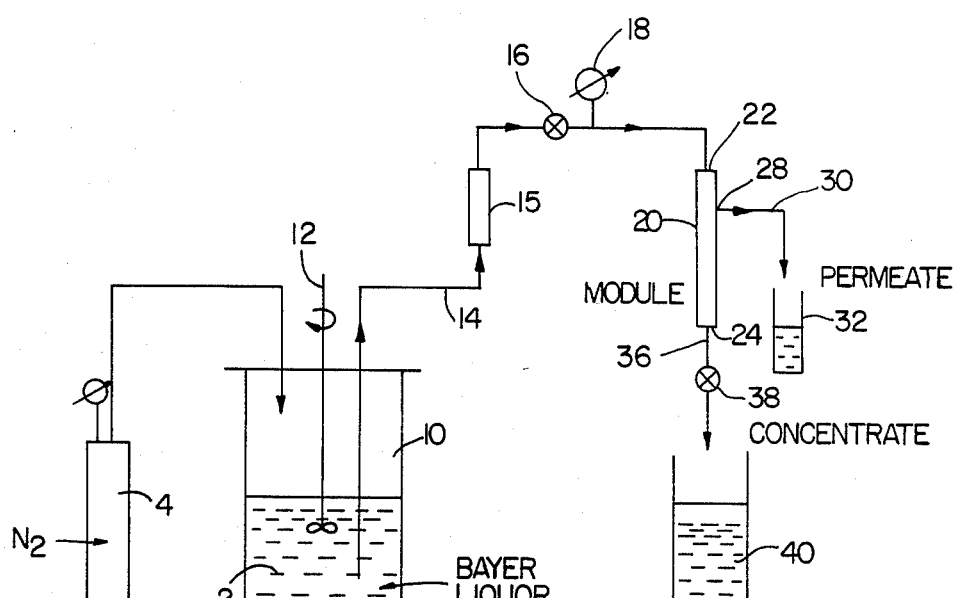
FIG. 1 is a diagram showing one embodiment of the invention.

Referring now to FIG. 1, Bayer spent liquor, i.e., a caustic sodium aluminate liquor from a Bayer process after initial precipitation, is shown at 2 inside a pressure vessel 10 which is maintained under pressure from a source of pressurized gas 4 such as a nitrogen source. The liquor is preferably maintained at a temperature above room temperature and is kept agitated by stirrer means 12. The heated and pressurized liquor is fed to an entrance port 22 in a filter module 20 through flow meter 15, valve 16 and pressure gauge 18 via line 14. The liquor is filtered in filter module 20 to provide a purified permeate which exits filter module 20 via permeate exit port 28 to line 30 and is collected in vessel 32. The unfiltered concentrate exits module 20 via concentrate exit port 24 to line 36 where it passes into reservoir 40 through valve 38.

The filter medium in filter module 20 comprises a plurality of porous hollow polysulfone fibers or tubes which have been coated with a sulfonated polysulfone coating to form a semipermeable membrane. The coated fibers within filter module 20 may comprise an annulus of helically wound porous hollow fibers. At least one end of all or most of the hollow fibers is open and these open ends are directed toward a portion of filter module 20 spaced apart from entrance port 22 and concentrate exit port 24. The purified liquid is then collected from these open ends of the porous fibers adjacent permeate exit port 28.

Construction details for filter modules of this type are generally described in U.S. Pat. Nos. 4,045,85; 4,207,192; 4,210,536; 4,220,489; 4,267,630; and 4,351,092; cross-reference to which is hereby made. Sulfonated polysulfone materials which may be used in forming the semipermeable membrane coating on the porous hollow fibers are described in U.S. Pat. Nos. 4,413,106 and 4,508,852; cross-reference to which is hereby made. While reference has been made herein to sulfonated polysulfone materials for forming semipermeable membranes, it will be understood that other membranes may be used which are inert to the highly caustic solutions and which provide satisfactory separation.

The pressure under which the liquor should be maintained during the filtration step preferably ranges from about 34 to 1380 kPa (5 to 200 psig), although higher pressures may be used and should be deemed to be within the scope of the practice of the invention. The temperature at which the liquor is maintained during filtration should preferably range from around 35 to 100° C. (95° to 212° F.), preferably about 72° C. (162° F.).

Figure 2:
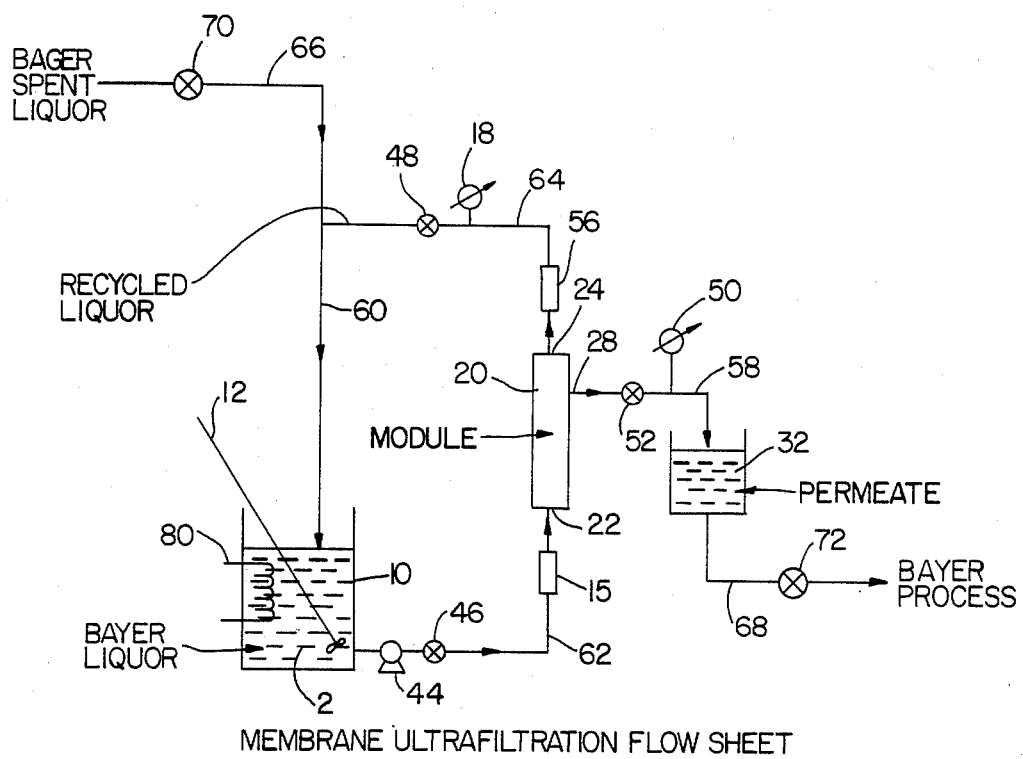
FIG. 2 is a diagram illustrating another embodiment of the invention.

While the process diagram of FIG. 1 illustrates the system of the invention as operated on a batch basis, the system advantageously, may be operated continuously as shown in FIG. 2. In FIG. 2, the Bayer spent liquor 2 in vessel 10 is pumped to filter module 20 by a pump 44 through line 62 while the flow is monitored by flow meter 15. The permeate discharged from module 20 via exit port 28 flows via line 58 through valve 52 to vessel 32 while the pressure of the flow is monitored by pressure gauge 50. The permeate may be returned to the Bayer process or otherwise utilized by removing the permeate from vessel 32 via line 68 through valve 72.

In this embodiment, pump 44 maintains the desired pressure on the filter membranes in filter module 20. The concentrate leaves module 20 via exit port 24 and line 64 to pass through flow meter 56 and valve 48. Pressure in line 64 is monitored by pressure gauge 18. Line 64 joins with liquor input line 66 to feed liquor back to vessel 10 via line 60. Additional liquor from a liquor precipitation stage or the like may thus be fed in via line 66 and valve 70, if desired, to be blended with the recycle stream of liquor concentrate in line 64. The temperature of the liquor is maintained in vessel 10 via heating means 80.

Figure 3:
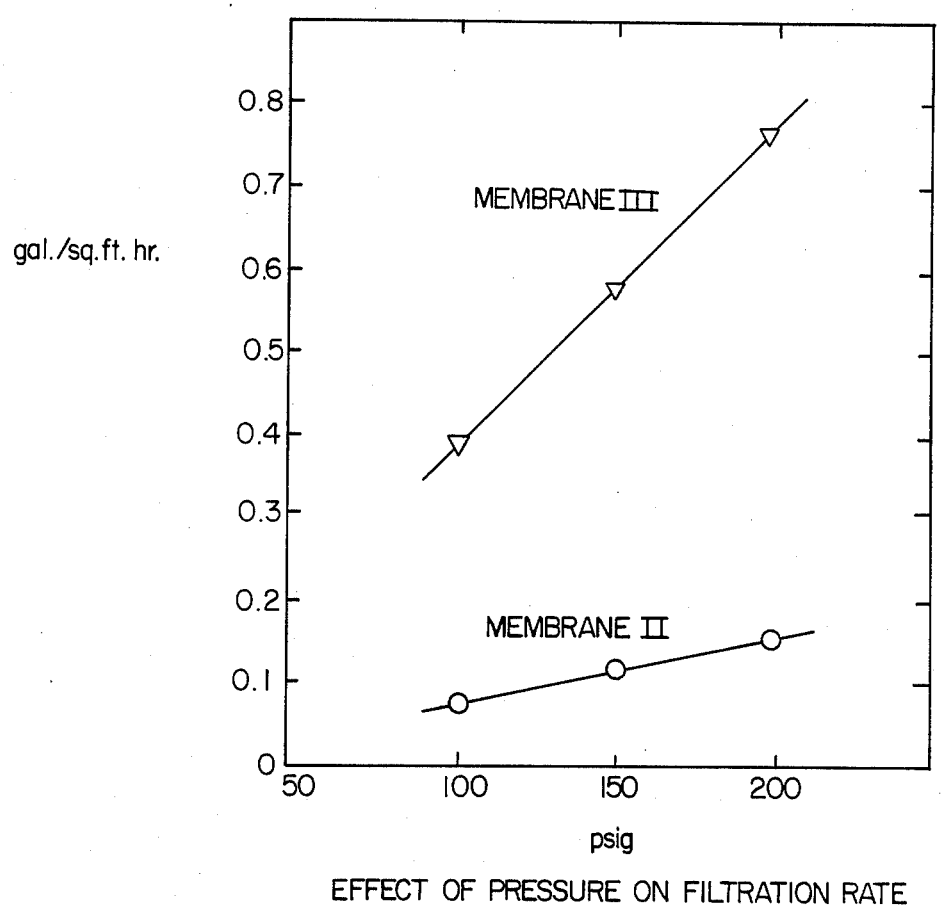
FIG. 3 is a graph showing the effect of pressure on filtration.

To illustrate the effectiveness of the system of the invention, several types of Bayer liquor were purified by the system shown in FIG. 3 using, respectively three different filter membranes of varying permeability. The results of the tests are shown in Tables 1 and 2. Filtration rate data with respect to pressure is shown in the graph of FIG. 3. In each test, feed and permeate liquor sample were collected and analyzed for alumina, total caustic soda (TC), total alkali (TA), organic carbon, sodium oxalate, iron, silica, and liquor color.

The organic carbon and sodium oxalate concentrations of the liquor were analyzed using an Astro organic carbon analyzer Model 1850 and an ion chromatograph, respectively. Liquor color was measured by light transmission of 1:10 diluted samples at a wavelength of 435 nm. A reference of 100% for distilled water was used for comparison. Liquor color measurement was also conducted on undiluted samples at 691 nm. The decrease of the humate concentration in the liquor can be observed by the change in the color of the permeate. Equivalent humate concentration was measured by the liquor color at 691 nm and was directly correlated to the color of a standard humate solution in caustic liquor.

As shown in Table 1, it was discovered that for liquor type "A", depending upon the permeability of the membrane, a decrease of the humate concentration of the permeate was observed as can be shown by the increase of the percentage of light transmission, measured at 691 nm, of from 82.6 up to 99.1%. This decrease was also measured by the increase in light transmission at 435 nm, of from 27.6 up to 80.3% with reference to 100% of distilled water. This translates to a decrease in humate concentration of 0.12 down to 0.01 gram/liter (g/l). In addition, organic carbon concentration was also lowered from 14.4 down to 9.1 g/l and sodium oxalate from 3.4 down to 1.1 g/l. For the less permeable membrane, it was observed that sodium carbonate and silicon dioxide were lowered, respectively, from 53 and 0.61 g/l to 49.9 and 0.33 g/l. Iron oxide was also slightly reduced from 0.005 to 0.004 g/l.

TABLE I

| | Membrane Ultrafiltration of Bayer Liquor "A" at 72° C. | | | | | | |
|---|---|---|---|---|---|---|---|
| | Start Liquor | Membrane I | | Membrane II | | Membrane III | |
| | | Permeate | Corr.[1] | Permeate | Corr.[1] | Permeate | Corr.[1] |
| $Al_2O_3$ g/l | 80.7 | 82.3 | 76.2 | 82.4 | 76.3 | 82.7 | 79.7 |
| TC g/l | 189.7 | 204.8 | 189.7 | 202.4 | 189.7 | 196.6 | 189.7 |
| TA g/l | 242.7 | 254.4 | 235.6 | 255.7 | 239.6 | 253.1 | 244.2 |
| $SiO_2$ g/l | 0.61 | 0.37 | 0.34 | 0.35 | 0.33 | 0.52 | 0.50 |
| $Fe_2O_3$ g/l | 0.005 | 0.004 | 0.004 | 0.004 | 0.004 | 0.004 | 0.004 |
| Org. Carb. g/l | 14.4 | 9.8 | 9.1 | 10.4 | 9.7 | 13.6 | 13.1 |
| $Na_2CO_3$ g/l | 53.0 | 49.6 | 45.9 | 53.3 | 49.9 | 56.5 | 54.5 |
| $Na_2C_2O_4$ g/l | 3.4 | 1.2 | 1.1 | 1.5 | 1.4 | 3.1 | 3.0 |
| Humate g/l | 0.12 | 0.01 | — | 0.01 | — | 0.02 | — |
| A/TC | 0.425 | 0.402 | 0.402 | 0.407 | 0.402 | 0.421 | 0.420 |
| % Transmission | | | | | | | |
| 435 nm | 27.6 | 80.3 | — | 76.3 | — | 52.1 | — |
| 691 nm | 82.6 | 98.2 | — | 99.1 | — | 97.0 | — |
| Press. psig | — | 200 | — | 200 | — | 150 | — |
| Filt. Rate gal/sq ft/hr | — | $4.9 \times 10^{-2}$ | — | $12.2 \times 10^{-2}$ | — | $44.1 \times 10^{-2}$ | — |

[1]corrected value to the same caustic concentration of starting liquor

The results obtained when filtering liquor type "B" are shown in Table 2. The humate concentration of the permeate in this instance was lowered as measured by the light transmission at 691 nm to provide an increase in light transmission of from 42.3 up to 98.4% and from 7.0 to 79.5% of the 1:10 diluted liquor samples measured at 435 nm. This corresponds to a drop in the humate concentration from 0.64 down to 0.01 g/l. Organic carbon concentration was lowered from 5.2 down to 2.1 g/l.

TABLE II

Membrane Ultrafiltration of Bayer Liquor "B" at 72° C.

| | Start Liquor | Membrane I Permeate | Membrane I Corr.[1] | Membrane II Permeate | Membrane II Corr.[1] | Membrane III Permeate | Membrane III Corr.[1] |
|---|---|---|---|---|---|---|---|
| $Al_2O_3$ g/l | 42.7 | 42.1 | 40.2 | 42.1 | 40.2 | 42.9 | 42.1 |
| TC g/l | 141.0 | 147.7 | 141.0 | 147.7 | 141.0 | 143.8 | 141.0 |
| TA g/l | 203.8 | 201.5 | 192.3 | 207.1 | 197.7 | 207.1 | 203.1 |
| $SiO_2$ g/l | 0.29 | 0.31 | 0.29 | 0.29 | 0.29 | 0.29 | 0.28 |
| $Fe_2O_3$ g/l | 0.004 | 0.004 | 0.004 | 0.004 | 0.004 | 0.004 | 0.004 |
| Org. Carb. g/l | 5.2 | 2.2 | 2.1 | 2.4 | 2.3 | 3.6 | 3.5 |
| $Na_2CO_3$ g/l | 62.8 | 53.8 | 51.3 | 59.4 | 56.7 | 63.3 | 62.1 |
| $Na_2C_2O_4$ g/l | 2.9 | 2.6 | 2.5 | 2.9 | 2.8 | 3.0 | 2.9 |
| Humate g/l | 0.64 | 0.01 | — | 0.03 | — | 0.05 | — |
| A/TC | 0.302 | 0.285 | 0.285 | 0.285 | 0.285 | 0.298 | 0.298 |
| % Transmission | | | | | | | |
| 435 nm | 7.0 | 79.5 | — | 77.0 | — | 43.8 | — |
| 691 nm | 42.3 | 98.4 | — | 95.3 | — | 91.5 | — |
| Press. psig | — | 200 | — | 200 | — | 200 | — |
| Filt. Rate gal/sq ft/hr | — | $15.9 \times 10^{-2}$ | — | $28.1 \times 10^{-2}$ | — | $122.5 \times 10^{-2}$ | — |

[1]corrected value to the same caustic concentration of starting liquor

The effect of pressure on the filtration rate is shown for both Membrane II and Membrane III in FIG. 3. It will be noted that the filtration rate goes up for both membranes but rises more rapidly with pressure for the more porous Membrane III than Membrane II.

Figure 5:
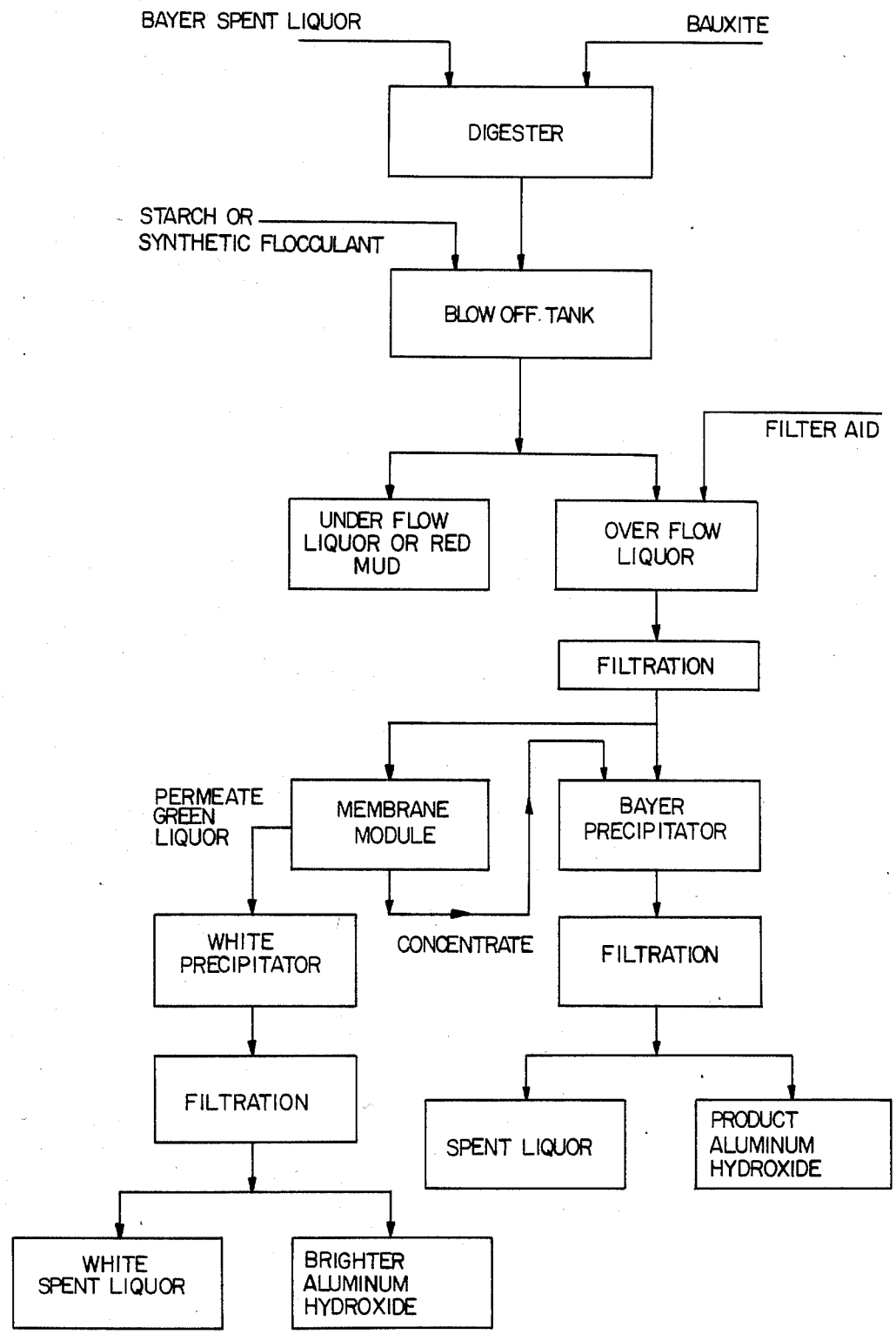
FIG. 5 is a flow diagram illustrating steps for producing whiter aluminum hydroxide.

Reference is now made to FIG. 5 for purposes of illustrating a method for producing aluminum hydroxide having improved whiteness.

In FIG. 5, Bayer spent liquor with the composition shown in Table III was fed to a digester to digest bauxite which had the analysis shown in Table IV. The bauxite used is characterized with low silica and iron contents with total sulfur of 0.32%, total carbon and total organic carbon of respectively 0.57 and 0.35%. It contained also siderite, and iron carbonate compound. This type of bauxite produces aluminum hydroxide with high iron content as a result of siderite and sulfur compounds. It has been reported in the literature that during digestion, the siderite reacts with caustic soda to form finely colloidal ferrous hydroxide particles which are very difficult to remove by the conventional Bayer filtration technique.

Digestion was conducted at 143° C. for 30 minutes. After digestion, the slurry was discharged to a blow-off tank. Sufficient amount of starch or synthetic flocculant was added to the blow-off slurry to promote the settling of red mud. Overflow liquor was then separated from the settled mud. Calcium filter aid in the amount of 1 g/L as CaO was added to the overflow liquor. The slurry was then filtered using No. 4 Whatman paper. The resulting filtered green liquor was adjusted to precipitation temperature, seeded with sufficient amount of dry aluminum hydroxide seed, and precipitated in a Bayer precipitator tank for 24 hours at a constant temperature of 74° C. Aluminum hydroxide was filtered using No. 42 Whatman paper, washed with sufficient amount of distilled water, dried, weighed and submitted for Inductively Coupled Plasma, microtrac and hydrate brightness analyses. To demonstrate the benefit of the membrane filtration technique, a portion of the filtered green liquor from the overflow liquor tank was fed to the membrane module at a pressure of 1380 kPa (200 psig). The membrane module comprised of porous hollow polysulfone fibers coated with semipermeable sulfonated polysulfone membrane. Liquor temperature was maintained at about 75° C. The permeate green liquor from the membrane module was treated for precipitation in the white precipitator tank with the same precipitation conditions as described above.

Organic carbon concentration in the filtered green liquors was analyzed using Astro organic carbon analyzer. Liquor color was measured using Bausch & Lomb Spectronic-2000 spectrophotometer. Measurement was conducted by the light absorbance at a wave length of 691 nm. The change of the equivalent humate concentration of the liquor can be observed by the change in liquor color and was directly correlated to the color of a standard humate solution in caustic liquor. The results of the experiments are tabulated in Table V.

As shown in Table V, membrane filtration of green liquor produced a permeate with low color as indicated by the light absorbance at 691 nm of 0.010 compared to 0.460 of the control run. This translates to a decrease in equivalent humate concentration from 0.67 to 0.01 g/L. The purified green liquor produced aluminum hydroxide with a brightness of 91.6% compared to 72.4% of the control. In addition, the corresponding $Fe_2O_3$, $SiO_2$, CaO and $Na_2O$ contents were significantly lowered from 0.060, 0.008, 0.018 and 0.36% to respectively, 0.026, 0.001, 0.012 and 0.17% on calcined basis. Particle size of the product aluminum hydroxide, shown by the particles finer than 38 micrometers, were not significantly different. Alumina yield produced by the permeate was slightly lower due to the slight decrease in alumina to caustic soda weight ratio in the green liquor. It seems that a small amount of alumina was rejected during the membrane filtration.

The results of membrane filtration of green liquor obtained by digesting either bauxite or impure aluminum hydroxide in organic free synthetic sodium aluminate liquor are presented in Table VI. The experiments were performed with the objective to determine the effect of recycling the purified spent liquor, which was simulated by an organic free synthetic sodium aluminate liquor. In this case, the overflow liquors were treated with additional 2 g/L MgO, in an attempt to further lower the iron in liquor.

In the first set of experiments, the green liquor was prepared by digesting bauxite with the composition shown in Table IV. The color of the permeate was improved from a light absorbance at 691 nm of 0.059 to 0.001, which translates to a drop in equivalent humate concentration from 0.1 g/L to almost neglibible. The permeate produced brighter aluminum hydroxide of 93.5% brightness compared to 85.2% of the control run. $Fe_2O_3$, $SiO_2$, CaO and $Na_2O$ were correspondingly decreased to respectively, 0.021, 0.003, 0.011 and 0.26% on calcined basis. For the second set of experminents, the green liquor was obtained by digesting impure aluminum hydroxide with impurities shown in Table VII and organic free synthetic liquor. In this case, liquor color measurement at 691 nm show no difference between permeate and control liquor. For both liquors, they measured at 0.001, which corresponds to negligible humate concentration. However, liquor absorbance determined at 435 nm indicated low color of permeate of 0.007 compared to 0.045 of the control. This low color permeate produced aluminum hydroxide of 94.1% brightness compared to 93.0% of the control run. Product particle size, shown by the particles finer than 38 micrometers, were not significantly different. They registered respectively, 3.5 and 5.5%.

Significantly, this technique has demonstrated the capability of membrane filtration to effectively lower the impurities in Bayer green liquor, especially, the humate materials, the color imparting organic matter, thereby producing a better quality aluminum hydroxide with brighter color and lower impurities.

TABLE III

| Composition of Start Liquor | |
|---|---|
| | g/l |
| $Al_2O_3$ | 62.1 |
| Total Caustic Soda (TC) | 178.2 |
| Total Alkali (TA) | 250.4 |
| Total Organic Carbon (TOC) | 4.5 |
| $Na_2C_2O_4$ | 3.1 |
| Absorbance (691 nm) | 0.346 |

TABLE IV

| Bauxite Analysis | |
|---|---|
| | % Composition |
| $Al_2O_3$ | 56.5 |
| $SiO_2$ | 3.96 |
| $Fe_2O_3$ | 3.66 |
| $TiO_2$ | 2.43 |
| CaO | 0.10 |
| LOF | 31.7 |
| Total S | 0.32 |
| Sulfate S | 0.08 |
| Total C | 0.57 |
| TOC | 0.35 |
| XRD Analysis | |
| Major Phase | Gibbsite |
| Minor Phase | Siderite |
| Minor Phase | Kaolinite |
| Very Small | Boehmite |

TABLE V

| Green Liquor Purification by Membrane Filtration (Bauxite and Plant Spent Liquor) | | |
|---|---|---|
| | Control | Permeate |
| Liq. anal. g/L | | |
| $Al_2O_3$ | 108.9 | 99.5 |
| TC | 169.1 | 164.3 |
| TA | 245.4 | 231.8 |
| $Al_2O_3$/TC | 0.644 | 0.605 |
| TC/TA | 0.689 | 0.709 |
| TOC | 4.4 | 3.3 |
| $Na_2C_2O_4$ | 3.4 | 2.2 |
| $SiO_2$ | 0.39 | 0.07 |
| $Fe_2O_3$ | 0.033 | 0.012 |
| Humate | 0.67 | 0.01 |
| Abs. (691 nm) | 0.460 | 0.010 |
| Abs. (435 nm) | 9.79 | 0.36 |
| $Al_2O_3$ yield, g/L | 39.2 | 34.1 |
| Prod. anal. % (2) | | |
| $Fe_2O_3$ | 0.060 | 0.026 |
| $SiO_2$ | 0.008 | 0.001 |
| CaO | 0.018 | 0.012 |
| $Na_2O$ | 0.36 | 0.17 |
| Brightness, % (1) | 72.4 | 91.6 |
| −38 micrometers, Part. | 8.5 | 8.5 |

(1) Reference: 100% for $TiO_2$ standard.
(2) On calcined basis and adjusted to net 45 g/L yield basis.

TABLE VI

| | Green Liquor Purification by Membrane Filtration (Bauxite or Hydrate and Synthetic Liquor) | | | | |
|---|---|---|---|---|---|
| | Start Liquor | Bauxite and Synthetic Liquor | | Hydrate and Synthetic Liquor | |
| | | Control | Permeate | Control | Permeate |
| Liquor analysis g/L | | | | | |
| $Al_2O_3$ | 61.8 | 109.5 | 101.3 | 110.5 | 103.4 |
| TC | 183.4 | 175.7 | 168.3 | 177.1 | 175.6 |
| TA | 254.1 | 243.4 | 226.6 | 242.6 | 229.6 |
| $Al_2O_3$/TC | 0.337 | 0.623 | 0.602 | 0.624 | 0.589 |
| TC/TA | 0.721 | 0.721 | 0.743 | 0.730 | 0.765 |
| TOC | | 0.2 | 0.2 | 0.2 | 0.2 |
| $Na_2C_2O_4$ | | 0.08 | 0.06 | 0.02 | 0.02 |
| $SiO_2$ | — | 0.29 | 0.06 | 0.08 | 0.06 |
| $Fe_2O_3$ | — | 0.020 | 0.020 | 0.030 | 0.020 |
| CaO | — | 0.010 | 0.010 | 0.010 | 0.010 |

TABLE VI-continued

Green Liquor Purification by Membrane Filtration
(Bauxite or Hydrate and Synthetic Liquor)

|  | Start Liquor | Bauxite and Synthetic Liquor | | Hydrate and Synthetic Liquor | |
| --- | --- | --- | --- | --- | --- |
|  |  | Control | Permeate | Control | Permeate |
| Humate | — | 0.10 | 0 | 0 | 0 |
| Absorbance (691 nm) | 0.001 | 0.059 | 0.001 | 0.001 | 0.001 |
| Absorbance (435 nm) | 0.232 | 0.741 | 0.047 | 0.045 | 0.007 |
| $Al_2O_3$ yield, g/L |  | 43.0 | 39.0 | 43.5 | 37.5 |
| Product analysis % (1) |  |  |  |  |  |
| $Fe_2O_3$ |  | 0.030 | 0.021 | 0.033 | 0.023 |
| $SiO_2$ |  | 0.013 | 0.003 | 0.003 | 0.001 |
| CaO |  | 0.012 | 0.011 | 0.025 | 0.015 |
| $Na_2O$ |  | 0.37 | 0.26 | 0.32 | 0.23 |
| Brightness, % (2) |  | 85.2 | 93.5 | 93.0 | 94.1 |
| −38 micrometer, part. |  | 4.1 | 5.2 | 3.5 | 5.5 |

(1) On calcined basis and adjusted to net 45 g/L $Al_2O_3$ yield basis.
(2) Reference: 100% for $TiO_2$ standard.

TABLE VII

Impurity Contents of the Impure Aluminum Hydroxide:
Inductively Coupled Plasma Analysis

|  | % Composition |
| --- | --- |
| $SiO_2$ | 0.011 |
| $Fe_2O_3$ | 0.025 |
| $TiO_2$ | 0.001 |
| $Na_2O$ | 0.36 |
| CaO | 0.021 |
| % Brightness | 67.8 |
| % −38 micrometer part. | 6.9 |
| Median particle size | 82.8 micrometers |

Thus, the invention provides an improved method for the purification of a caustic solution such as a sodium aluminate solution from a Bayer process wherein both organic and inorganic impurity levels may be reduced.

Having thus described the invention, what is claimed is:

1. A process for producing an improved aluminum hydroxide product characterized by an improved level of whiteness, the process comprising the steps of:
   (a) subjecting a caustic solution containing dissolved aluminum hydroxide to a purification step to remove dissolved impurities including color producing humate material therefrom, the purification comprising passing said caustic solution through porous hollow sulfonated polysulfone fibers coated with a sulfonated polysulfone coating substantially inert to a highly caustic solution and capable of separating said humate material from said solution; and
   (b) treating the purified solution to precipitate aluminum hydroxide therefrom having an improved level of whiteness.

2. The process in accordance with claim 1 wherein the caustic solution is Bayer liquor.

3. The process in accordance with claim 1 wherein the impurities include at least a compound selected from the group consisting of iron, sodium and silicon compounds.

4. The process in accordance with claim 1 wherein the aluminum hydroxide has a level of whiteness of at least 75%.

5. The process in accordance with claim 1 wherein the aluminum hydroxide has a level of whiteness of at least 90%.

6. The process in accordance with claim 1 wherein said solution is maintained at a temperature in the range of 35° to 100° C. when subjected to said purification step.

7. A process for producing an improved aluminum hydroxide product having an improved level of whiteness, the process comprising the steps of:
   (a) subjecting a Bayer liquor at a temperature in the range of 35° to 100° C. to a purification step to remove color producing impurities therefrom, the impurities including humate material, iron and silicon compounds, the purification comprising bringing said Bayer liquor in contact with the outside of a plurality of porous hollow polysulfone fibers having a sulfonated polysulfone coating thereon, said fibers having an open end;
   (b) collecting purified liquor from the open ends of said fibers;
   (c) treating the purified solution to precipitate aluminum hydroxide therefrom; and
   (d) recovering aluminum hydroxide precipitate having a level of whiteness of at least 90%.

* * * * *